United States Patent [19]

Hall et al.

[11] Patent Number: 5,425,599
[45] Date of Patent: Jun. 20, 1995

[54] METHOD FOR REPAIRING A SUBMERGED PIPELINE

[75] Inventors: N. Victor Hall, Houston, Tex.; Peter Rash, Anglesea, Australia

[73] Assignee: Sonsub International Management, Inc., Houston, Tex.

[21] Appl. No.: 55,217

[22] Filed: Apr. 29, 1993

[51] Int. Cl.⁶ .......................... F16L 1/26; F16L 1/16
[52] U.S. Cl. .................... 405/158; 405/171; 405/172
[58] Field of Search .............. 405/154, 158, 159, 171, 405/172, 173; 285/31, 32; 138/97

[56] References Cited

U.S. PATENT DOCUMENTS

| | | | |
|---|---|---|---|
| 3,578,233 | 5/1971 | Meister et al. | 405/156 X |
| 3,603,617 | 9/1971 | Lochridge | 285/31 X |
| 3,656,309 | 4/1972 | Bultema | . |
| 3,853,182 | 12/1974 | Bourne, Jr. et al. | . |
| 3,861,158 | 1/1975 | Swain et al. | . |
| 3,972,554 | 8/1976 | Tryon | 294/97 |
| 4,109,480 | 8/1978 | Sumner | 405/173 |
| 4,195,865 | 4/1980 | Martin | 285/18 |
| 4,218,158 | 8/1980 | Tesson | 405/170 |
| 4,229,120 | 10/1980 | Wallace et al. | 405/158 |
| 4,234,268 | 11/1980 | Scodino | 405/158 |
| 4,252,466 | 2/1981 | Berti et al. | 405/172 |
| 4,253,779 | 3/1981 | Grognu | 405/169 |
| 4,268,190 | 5/1981 | Tesson | 405/154 X |
| 4,363,569 | 12/1982 | Scodino et al. | 405/303 |
| 4,371,198 | 2/1983 | Martin | 285/165 |
| 4,389,034 | 6/1983 | Suttles | 248/49 |
| 4,443,129 | 4/1984 | de Sivry et al. | 405/170 |
| 4,444,528 | 4/1984 | Scodino et al. | 405/173 |
| 4,445,804 | 5/1984 | Abdallah et al. | 405/173 |
| 4,676,531 | 6/1987 | Martin | 285/96 |
| 4,832,530 | 5/1989 | Anderson et al. | 405/170 |
| 5,044,827 | 9/1991 | Gray et al. | 405/173 |
| 5,201,610 | 4/1993 | Mansfield et al. | 405/172 |

FOREIGN PATENT DOCUMENTS

| | | | |
|---|---|---|---|
| 2536826 | 6/1984 | France | 405/172 |
| 2015115 | 9/1979 | United Kingdom | 405/158 |
| 2187436 | 12/1989 | United Kingdom | . |
| 1099171 | 6/1984 | U.S.S.R. | 405/158 |

OTHER PUBLICATIONS

"Remote Operated Placing System," published by Canflex Manufacturing, Inc., West Vancouver, B.C., Canada (4 pages, no date).
"Your Partner Offshore for Fabric Formwork and Grouting," published by Canflex Manufacturing, Inc., West Vancouver, B.C., Canada (5 pages, no date).
"Fabric Formwork Grouting Offshore," published by Canflex Manufacturing, Inc., West Vacncouver, B.C., Canada (10 pages, excerpted), no date).

(List continued on next page.)

Primary Examiner—Dennis L. Taylor
Assistant Examiner—John A. Ricci
Attorney, Agent, or Firm—Pravel, Hewitt, Kimball & Krieger

[57] ABSTRACT

A method for repairing a damaged subsea pipeline setting on the seabed includes the lowering of pipe support frames to the seabed and positioning the pipe support frames beneath the subsea pipeline on each side of the damaged pipeline section. The pipe support frames are expanded to elevate the damaged pipeline section. A pair of pipe attachment and receiving (PAR) assemblies are lowered to the seabed and positioned astride the pipeline on each side of the damaged section of the pipeline. The pipeline is gripped by the PAR assemblies. Cutting modules are lowered to the seabed and attached to each of the PAR assemblies. The pipeline is cut at each location with the cutting modules. The cutting modules are detached from the PAR assembly and a pair of docking modules are lowered to the seabed. One docking module is attached to each of the PAR assemblies. A telescoping spool section is lowered to the seabed and docked onto the docking modules. The telescoping spool section is expanded until the spool section engages the pipeline ends. The spool section is connected to the pipeline ends.

19 Claims, 12 Drawing Sheets

OTHER PUBLICATIONS

"Style '88' Pipeline Grout Support Bags," published by Canflex Manufacturing, Inc,. West Vancouver, B.C., Canada (14 pages, (excerpted), no date).

"General Information on Pipeline Stabilization and Protection," published by Wimpey Geotech Limited, Hayes, Middlesex, England (10 pages (excerpted), no date).

Sonsub International Management, Inc. compilation of various pieces of prior art equipment included in report entitled "Design Study Diverless Pipeline Repair System Report For Saipem," Nov. 8, 1991, 21 pages.

Sonsub International Management Inc. compilation of Sonsub conceptual drawings included in report entitled "Design Study Diverless Pipeline Repair System Report For Saipem," Nov. 8, 1991, 20 pages.

N. V. Hall and Mauro Brambilia, Deepwater Pipeline Repair Utilizing Advanced Remotely Operated Worksystems, 1993, 17 pages.

METHOD FOR REPAIRING A SUBMERGED PIPELINE

BACKGROUND OF THE INVENTION

1. Field of the Invention

The present invention relates to a method of repairing a submerged pipeline. More particularly, the invention relates to a method of remotely severing and replacing a damaged submerged pipeline without retrieval to the surface.

2. Description of the Prior Art

There are thousands of miles of pipelines laying on the seabed. Pipe laying technology permits pipelines to be laid in extremely shallow water depths to water depths of thousands of feet. A serious problem results when a subsea pipeline in deep water is damaged and in need of repair. A few examples of how a subsea pipeline can be damaged are by an object impacting the pipeline, an anchor dragging across the pipeline, or corrosion.

Typically, to repair a damaged submerged pipeline in the past, a couple of repair methods were available. One repair method required the damaged section of the pipeline to be recovered to the water surface and the necessary repairs were conducted on the deck of a vessel. After the repair was made the pipeline was lowered and repositioned on the seabed. This method was generally limited to small diameter pipelines in relatively shallow water. A second method involved conducting the repair in situ by divers, using either repair clamps or hyperbaric welding techniques. This method had also limitations related to water depth and pipeline size.

It is known to use a remotely operated vehicle (ROV) in deep water to sever and recover a submerged pipeline. U.S. Pat. No. 5,044,827 to Gray et al. discloses a method for severing and recovering a submerged pipeline. The ROV jets beneath a portion of the pipeline and then a deflated lift bag is lowered to the submerged pipeline. The deflated lift bag is positioned under the submerged pipeline and then inflated until a section of the pipeline has been raised off of the seabed. A cut-off saw is lowered to the raised section of the pipeline. The cut-off saw is clamped to the pipeline prior to severing the pipeline. The cut-off saw is then removed from the severed pipeline. A recovery head is lowered to the raised end of the severed pipeline and after alignment is placed in the raised end of the severed pipeline. The recovery head is activated to establish a gripping relationship with the pipeline. A recovery cable is lowered and connected to the recovery head. The recovery cable is retrieved to recover the recovery head and the pipeline to the water surface.

As the offshore pipeline industry continues to venture into deeper and deeper waters, more and more pipelines of increasing diameter are being laid in water depths beyond the range of divers. Due to a variety of factors such as pipeline size, seabed bearing capacity, sea currents, and lay barge daily rates, a reliable and dependable method for repairing submerged pipelines without retrieval to the water surface or the use of divers and hyberbaric welding is needed. The method should minimize the amount of handling of the damaged pipeline. Furthermore, the method of repairing the pipeline should minimize costs and dependency on vessel motions due to sea conditions, such as heave, roll, or pitch, which can result in a significant amount of standby time and cost.

SUMMARY OF THE PRESENT INVENTION

The present invention is a method for repairing a damaged subsea pipeline setting on the seabed. The damaged pipeline is repaired at the seabed and the method eliminates much of the standby time and associated costs resulting from adverse sea conditions.

The method includes mobilizing a floating vessel with the required equipment to the site above the damaged section of the pipeline. A plurality of pipe support frames are lowered to the seabed and positioned beneath the subsea pipeline on each side of the damaged pipeline section. The pipe support frames are expanded to elevate the damaged pipeline section. A pair of pipe attachment and receiving assemblies are lowered to the seabed and positioned astride the pipeline on each side of the damaged section of the pipeline. The pipeline is gripped by the pipe attachment and receiving assemblies. Cutting modules are lowered to the seabed and attached to each of the pipe attachment and receiving assemblies. The pipeline is cut with the cutting modules at each location of the attachment and receiving assemblies. The damaged section of the pipeline is removed. The cutting modules are detached from the attachment and receiving assembly and a pair of docking modules are lowered to the seabed. One docking module is attached to each of the attachment and receiving assemblies. A telescoping spool section is lowered to the seabed and docked onto the docking modules. The telescoping spool section is expanded until the spool section engages the pipeline ends. The spool section ends are hydraulically connected to the pipeline ends to complete the repair of the damaged pipeline. The installation equipment is then recovered to the floating vessel at the water surface.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, in which.

DETAILED DESCRIPTION OF THE INVENTION

The present invention relates to a method of repairing a submerged pipeline P. It is to be understood that the method can be used with divers or with remotely operated vehicles (ROV's); however, the following description describes the steps involved in repairing a pipeline P in deep water with a ROV due to the increased difficulties associated with a deep water repair.

Figure 1:
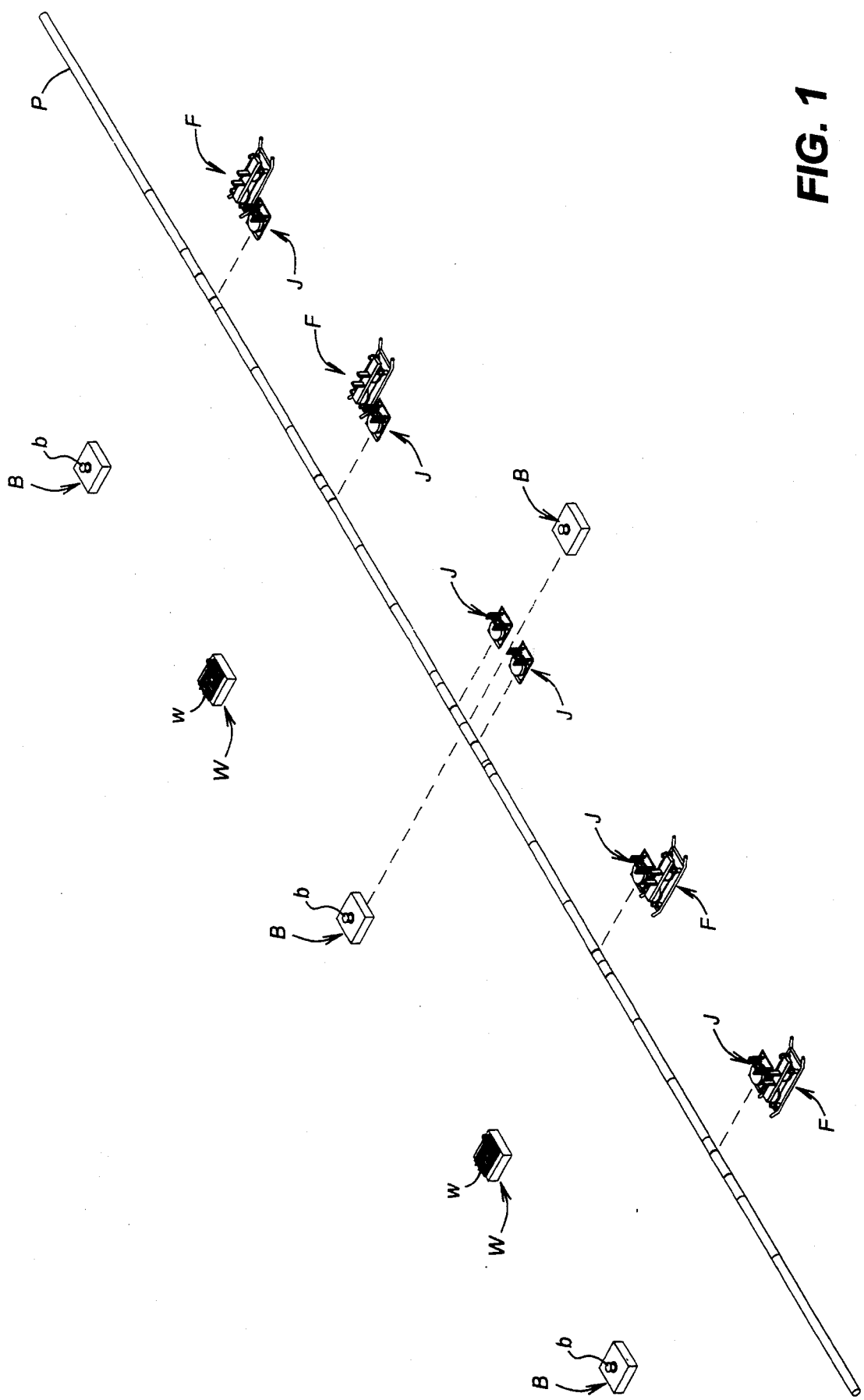
FIG. 1 is a diagrammatic view of a subsea pipeline with deployed bollard clump weighted, winch clump weights, jacking bag assemblies, and pipe support frames.
Figure 2:
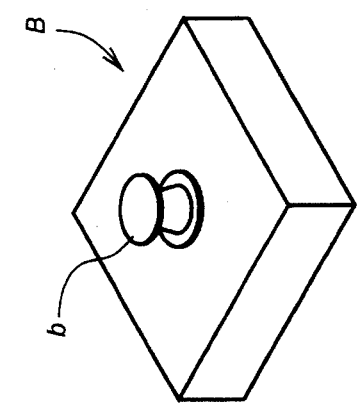
FIG. 2 is a perspective view of a bollard clump weight.
Figure 3:
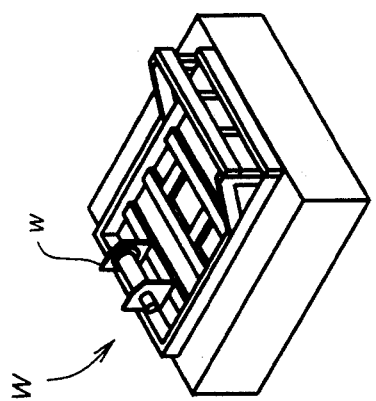
FIG. 3 is a perspective view of a winch clump weight.

Although not shown in the drawings, the equipment used to repair the damaged pipeline P is transported out to the site above the damaged pipeline P on a floating vessel. The floating vessel includes a crane for lowering the various pieces of equipment down to the work site. The floating vessel is moored or dynamically positioned above the damaged section of the pipeline P. As a preliminary step in the repair operation, the location of the damage to the pipeline P must be determined. External inspection techniques using the ROV can be used. The ROV is equipped with a camera and lights (not shown) which allows the operators on the floating vessel to view the seabed and the damaged pipeline P. The ROV carries out a seabed survey of the pipeline P and the general area for debris and damage. It is to be understood that the amount of equipment involved in making the repair may vary depending on the size of the pipeline P and the seabed conditions. Once the damaged section of pipeline P has been surveyed, a plurality of clump weights having either ROV utility winches w mounted on them or bollards b mounted thereon will be lowered and positioned alongside the pipeline P, as shown in FIG. 1. FIGS. 2 and 3 show representative bollard clump weights B and winch clump weights W, respectively.

The deployment of the equipment to the seabed is generally the same for all of the pieces of equipment which are lowered to the seabed. The deployment procedure will be explained with reference to lowering a bollard clump weight B. The bollard clump weight B is lifted by the crane on the floating vessel and lowered overboard via a davit and davit wire. A transponder (not shown) is attached to the davit wire so that the depth of the bollard clump weight B can be monitored as it is being lowered. The bollard clump weight B is lowered to approximately ten meters above the seabed. The ROV awaits the delivery of the bollard clump weight B to approximately ten meters above the seabed. Once sonar contact is made between the transponder and the ROV, the ROV flies to the bollard clump weight B and positions its placement on the seabed. Once placed on the seabed, a quick release shackle (not shown) is released and the davit wire is returned to the water surface. It is to be understood that a quick release shackle is well known in the remotely operated vehicle industry and thus has not been specifically shown.

The bollard and winch clump weights B and W, respectively, are lowered to the approximate locations as shown in FIG. 1. To ensure proper placement of the clump weights B and W on the seabed, the floating vessel may be repositioned until the coordinates of the davit wire transponder are in the target area for the respective clump weight. The vessel is repositioned to lower the additional clump weights to the seabed.

Figure 4:
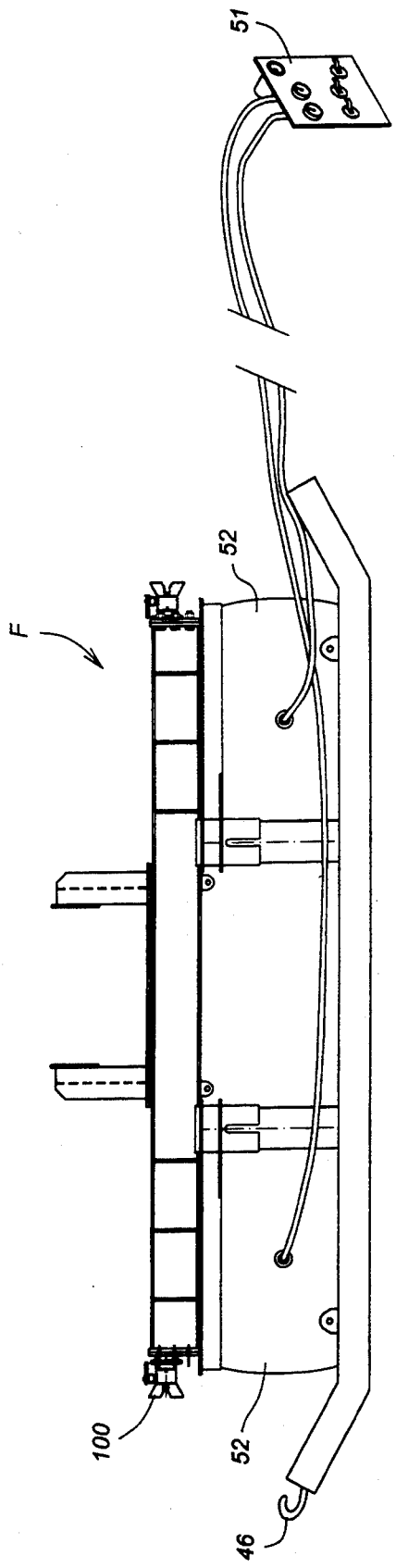
FIG. 4 is a side elevational view of the pipe support frame.

A pipe support frame F shown generally in FIG. 4 is next lowered to the seabed via the preceding deployment procedure. The pipe support frame F is described in detail in copending application entitled "PIPE SUPPORT FRAME" filed concurrently herewith. Applicants hereby incorporate by reference copending application entitled "PIPE SUPPORT FRAME" filed concurrently herewith.

Once sonar contact is made, the ROV flies to the pipe support frame F and the vessel is repositioned until the coordinates of the davit wire transponder are within the targeted area for the pipe support frame F. The ROV aligns the pipe support frame F into its assigned position, using manipulation to rotate the pipe support frame F. Once the pipe support frame F is correctly positioned on the seabed, the davit wire is released and returned to the surface. The remaining pipe support frames F are then similarly lowered. FIG. 1 shows the initial placement of the pipe support frames F along with the clump weights W and B on the seabed.

Figure 6:
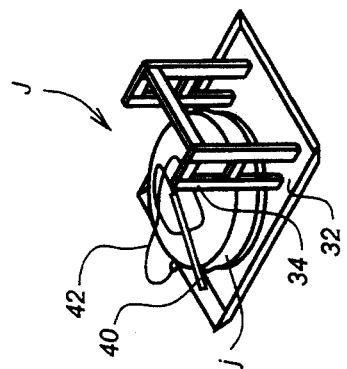
FIG. 6 is a perspective view of a jacking bag assembly.
Figure 5:
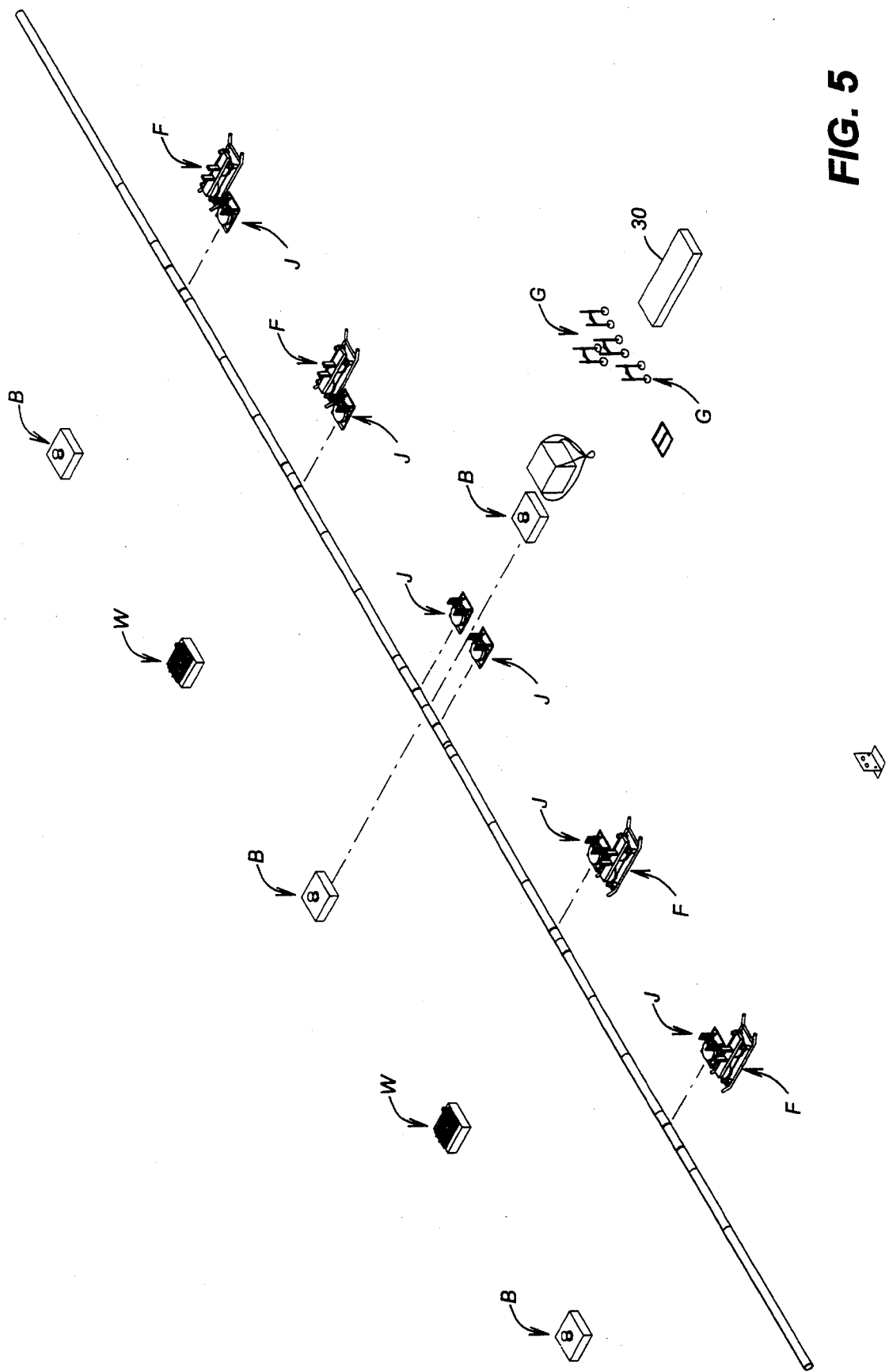
FIG. 5 is a diagrammatic view of the deployment of the jacking bag assemblies and pipe trestle gauges.

The vessel is then positioned for the deployment of a jacking bag deployment basket 30 (FIG. 5) containing a plurality of jacking bag assemblies J as shown in FIG. 6. The ROV flies to the deployment basket 30 and monitors its placement on the seabed, as described above. The ROV removes all jacking bag assemblies J from the basket 30 and the basket 30 is recovered to the surface of the water. The ROV relocates the jacking bag assemblies J to their predetermined positions, as shown in FIG. 5.

A perspective view of the jacking bag assembly J is shown in FIG. 6. The jacking bag assembly J includes a substantially flat base 32 having a guide frame 34. The jacking bag assembly J includes a jacking bag j attached to the upper surface of the flat base 32. A rod 40 is attached to a pulling rope 42 which is tied to the flat base 32.

Figure 8:
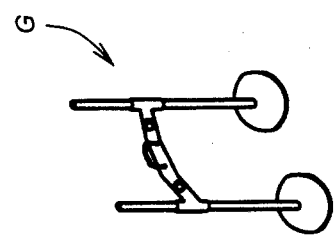
FIG. 8 is a perspective view of a pipe trestle gauge.
Figure 7:
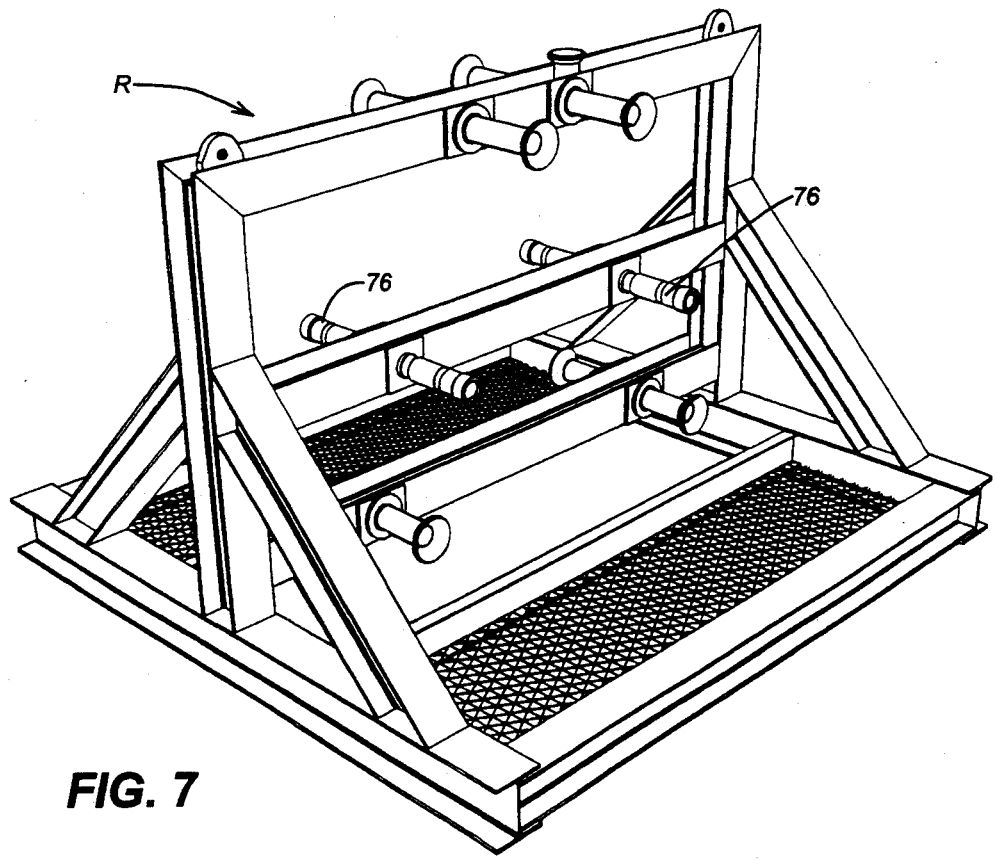
FIG. 7 is a perspective view of a stowage rack.

Referring to FIG. 7, a module stowage rack R is lowered to the seabed. Although not shown in FIG. 7, the module stowage rack R carries a pair of cutting modules which will be described below. Referring to FIG. 5, a plurality of pipe trestle gauges G (FIG. 8) are deployed from the vessel to the seabed.

Figure 9:
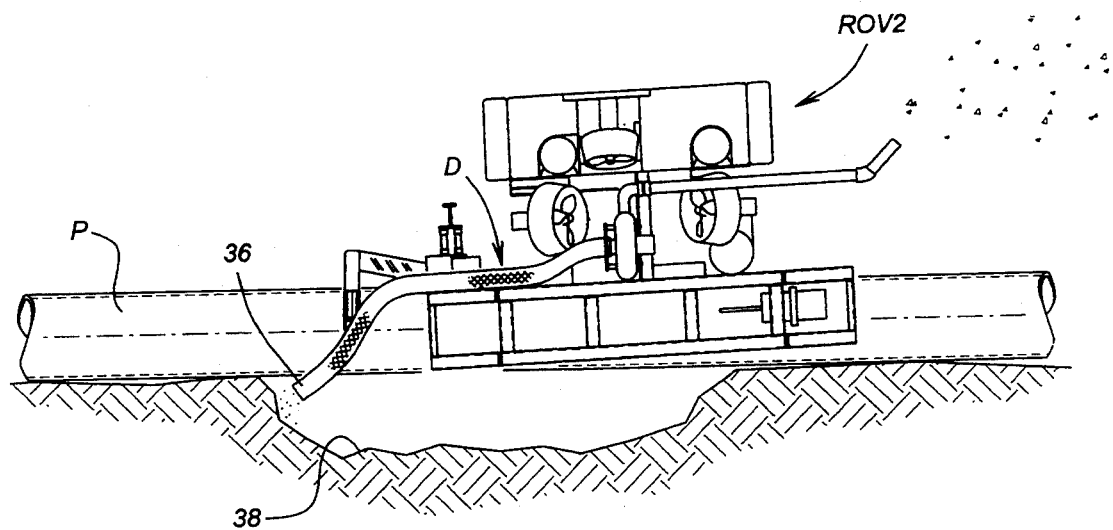
FIG. 9 is a side elevational view of the dredge package mounted to the ROV during the dredging operation.

Referring to FIG. 9, a dredge package D, which is commonly used in subsea operations with an ROV, is mounted to a second ROV, designated ROV2, on the deck of the vessel. ROV2 is deployed and swims to the installation position for a jacking bag assembly J. The dredge nozzle 36 is placed adjacent to the pipe P using the ROV2 manipulator. The dredge D is activated, as shown in FIG. 9, and the nozzle 36 is maneuvered with the ROV2 manipulator to allow selective dredging to take place. The dredging is continued until it is visually observed that a pocket 38 of sufficient size has been excavated. The dredge nozzle 36 is stowed using the ROV2 manipulator. The depth of excavation of the pocket 38 is gauged via the ROV2 manipulator. Similar pockets 38 are excavated at the other locations beneath the pipeline P and adjacent to the properly positioned jacking bag assemblies J.

Figure 10B:
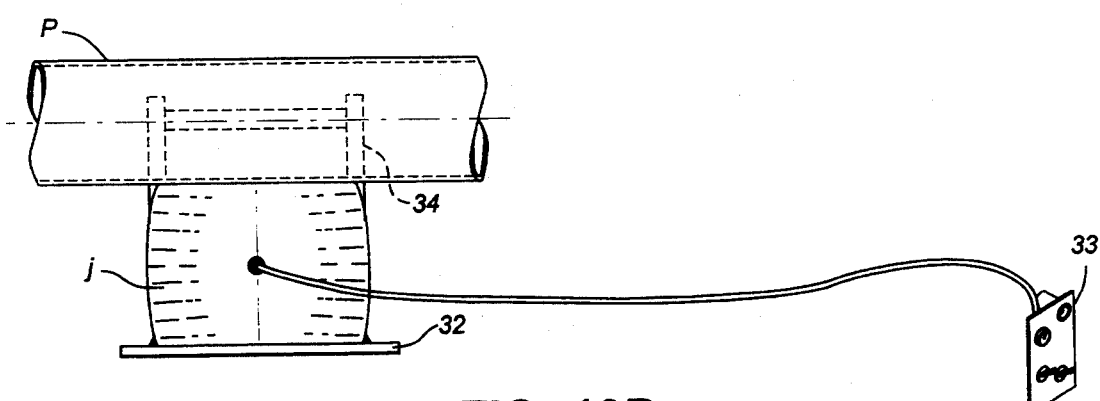
FIG. 10B is a front elevational view of the jacking bag assembly in the inflated position supporting the pipeline.
Figure 10A:
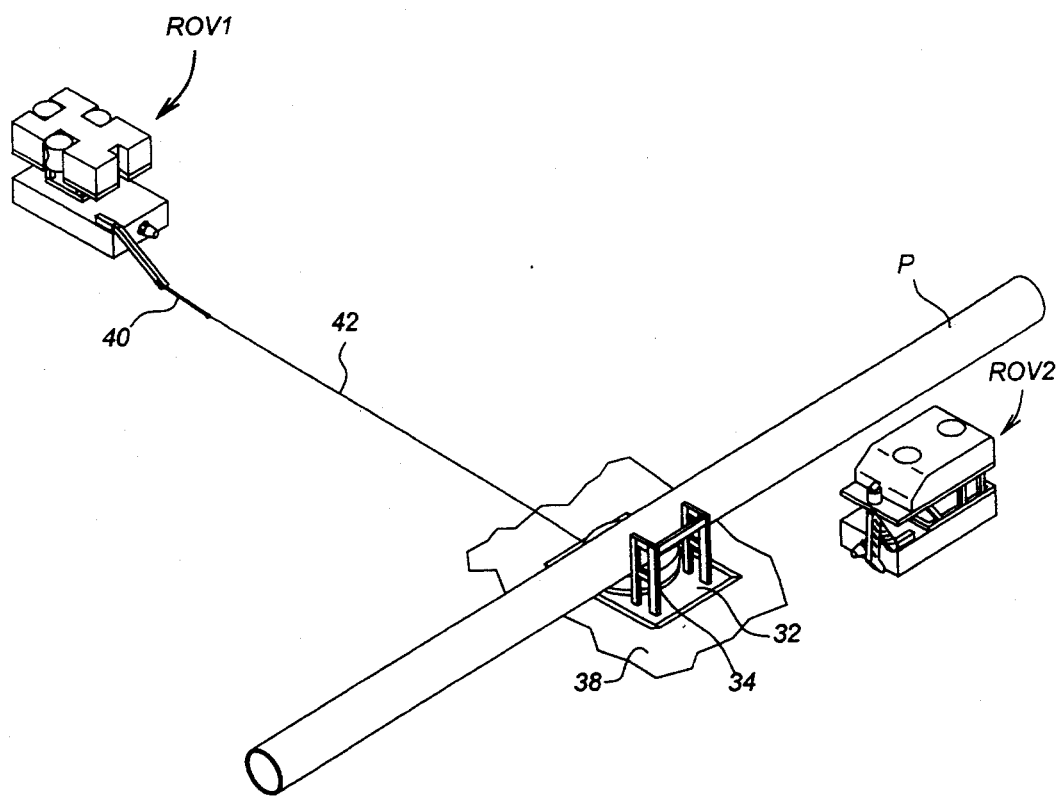
FIG. 10A is a diagrammatic view of the installation of a jacking bag assembly beneath the pipeline.

Referring to FIGS. 6 and 10A, the first ROV, referred to hereafter as ROV1, swims to the jacking bag assembly J and removes the rod 40 and the pulling rope 42 from the jacking bag assembly base member 32. The ROV1 passes the rod 40 with the attached pulling rope 42 under the pipeline P. The ROV1 releases the rod 40 and relocates itself to the other side of the pipeline P, where it retrieves the rod 40 with its manipulator. The ROV1 swims away from the pipeline P, pulling the jacking bag assembly J under the pipeline P and into the pocket 38 as shown in FIG. 10A. The ROV1 halts when the jacking bag assembly guide frame 34 is firmly against the pipeline P. The same steps are repeated for each of the jacking bag assemblies J.

Figure 11:
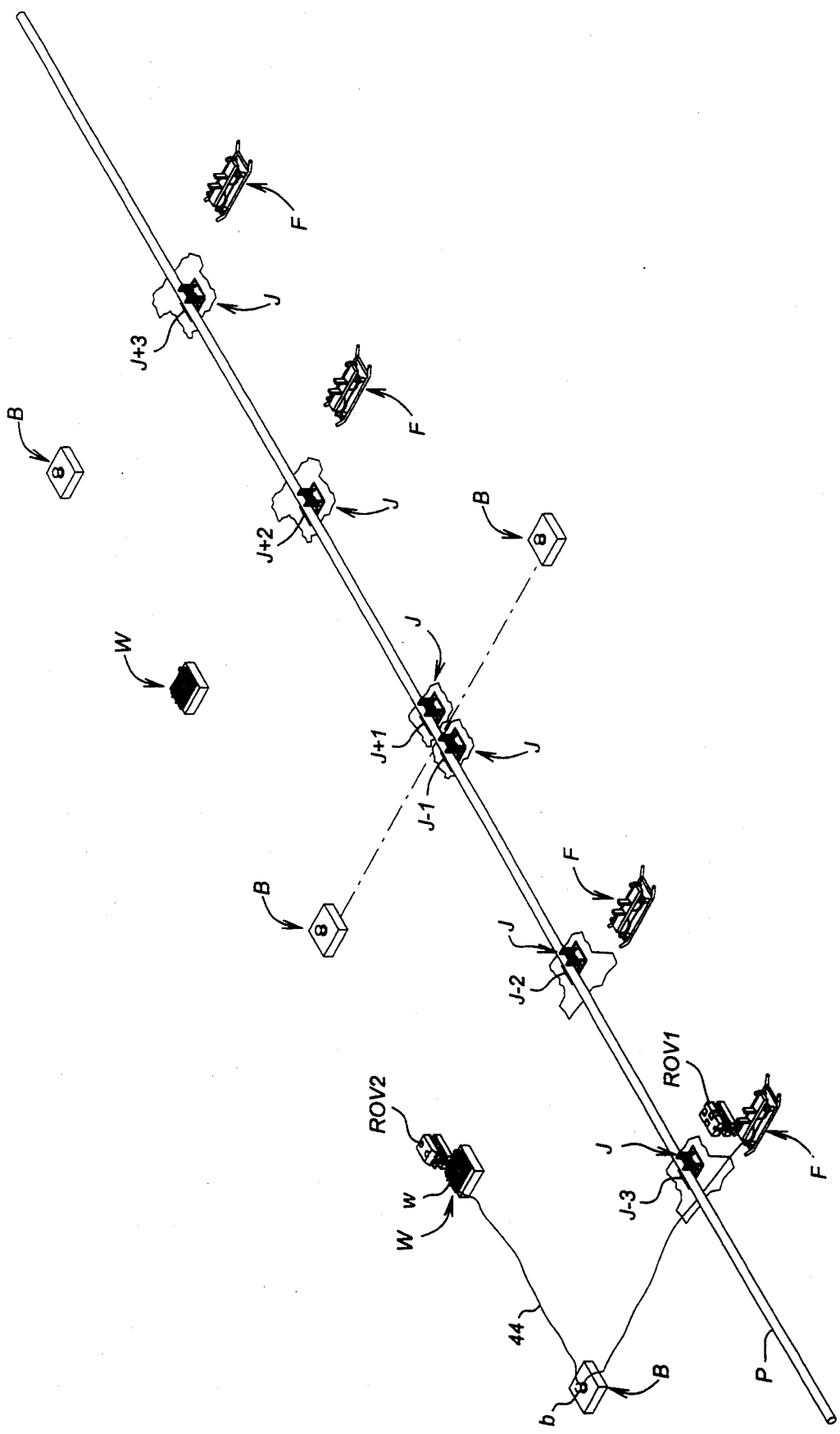
FIG. 11 is a diagrammatic view of a pipe support frame being pulled into position under the pipeline.

Referring to FIGS. 10B and 11, the pipeline P is elevated off the seabed by inflating the jacking bag assemblies J. Each ROV is equipped with a water stab (not shown) which is typical in the industry. ROV1 engages its water stab in a manifold 33 (FIG. 10B) of the jacking bag assembly J at location J-1 while ROV2 engages its water stab in a manifold 33 of the jacking bag assembly J at location J+1. The water pump on each ROV is activated to inflate the jacking bags j to a one meter maximum extension. Once inflated, a jacking bag inflation valve (not shown) is closed by the ROV manipulator and the water stab is removed. The jacking bags j at locations J-2 and J+2 are next similarly inflated with the jacking bags j at locations J-3 and J+3 lastly inflated. In the preferred method of the invention, the location J-1 and J+1 are equally spaced from a "zero" datum representing the midpoint of the length of damaged pipeline to be replaced. The other pairs of locations are similarly spaced about the "zero" datum point.

Referring to FIG. 11, the pipe support frames F are then installed under the pipeline P in the following manner. ROV2 operates the winch w to pay out the winch cable 44 while ROV1 runs the cable 44 around the bollard b and then to the pipeline P. ROV1 passes an end rod (not shown) of the winch cable 44 under the pipeline P using its manipulator. ROV1 swims to the other side of the pipeline P and retrieves the rod. ROV1 moves to the pipe support frame F and attaches the winch cable 44 to a pulling hook 46 (FIG. 4) on the pipe support frame F. ROV1 surveys the cable run to ensure that the cable 44 is properly located around the bollard b and not snagged. ROV1 sets up a pipe stop 50 on a trolley 48 of the pipe support frame F to accept the pipeline P. Referring to FIG. 11, ROV2 operates the winch w to haul in the cable 44 while ROV1 observes the pulling of the pipe support frame F. The winch w is stopped when the pipe stop 50 on the trolley 48 of the pipe support frame F contacts the pipeline P. ROV1 inserts the second pipe stop 50' in the trolley 48 or engages the trolley 48 until the pipe stop 50' can be vertically inserted in the pipe stop opening (not shown). Payout of the cable 44 from the winch w allows ROV1 to remove the pulling eye from the hook 46 of the pipe support frame F. Once released, ROV1 releases the cable 44 and ROV2 retrieves the cable 44 on the winch w. The same procedure is involved for pulling other pipe support frames F under the pipeline P. The bollard b is not required to be used when the winch w can directly pull the pipe support frame F under the pipeline P.

Figure 12:
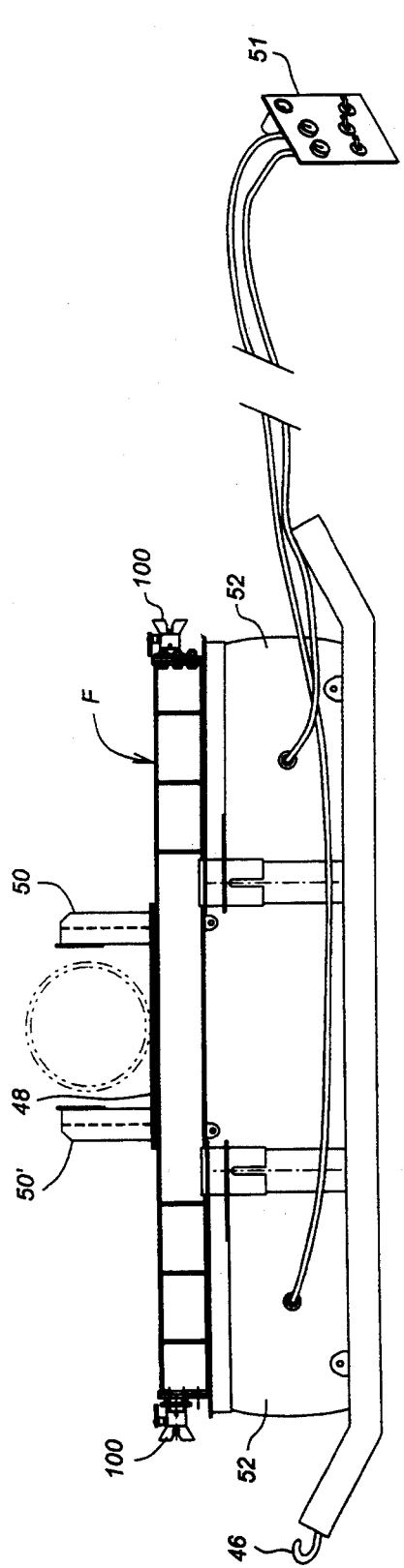
FIG. 12 is a side elevational view of a pipe support frame with inflated jacking bags and supporting the pipeline.

ROV1 places a pipe trestle gauge G at the location of each pipe support frame F. The pipe support frames F are located at locations J-2, J+2, J-3, and J+3 as shown in FIG. 11. ROV1 attaches to the pipe support frame F at location J-2 and engages its water stab in a manifold 51 (FIG. 12) of the pipe support frame F. ROV2 similarly takes position at the pipe support frame F at location J+2. The water pump on the ROV1 is operated to inflate the inflation bags 52 (FIG. 12) to 0.3 bar pressure or at a height differential of 1,000 millimeters. Once this height is reached, the valving is closed. ROV2 similarly inflates the inflation bags 52 of the pipe support frame F at location J+2. ROV1 then relocates to the pipe support frame F at location J-3. ROV1 attaches to the pipe support frame F and engages the manifold 51 with its water stab. The water pump is operated to inflate the inflation bags 52 to 0.3 bar pressure or a height differential of 900 millimeters, at which time the valving is closed. ROV2 is relocated to the pipe support frame F at location J+3 and attached to the structure. The water pump is operated on ROV2 to inflate the inflation bags 52 to a height differential of 900 millimeters, at which time the valving is closed. ROV1 then confirms the elevation of the pipe P at each of the pipe support frame locations J+2, J-2, J+3, and J-3.

Figure 13:
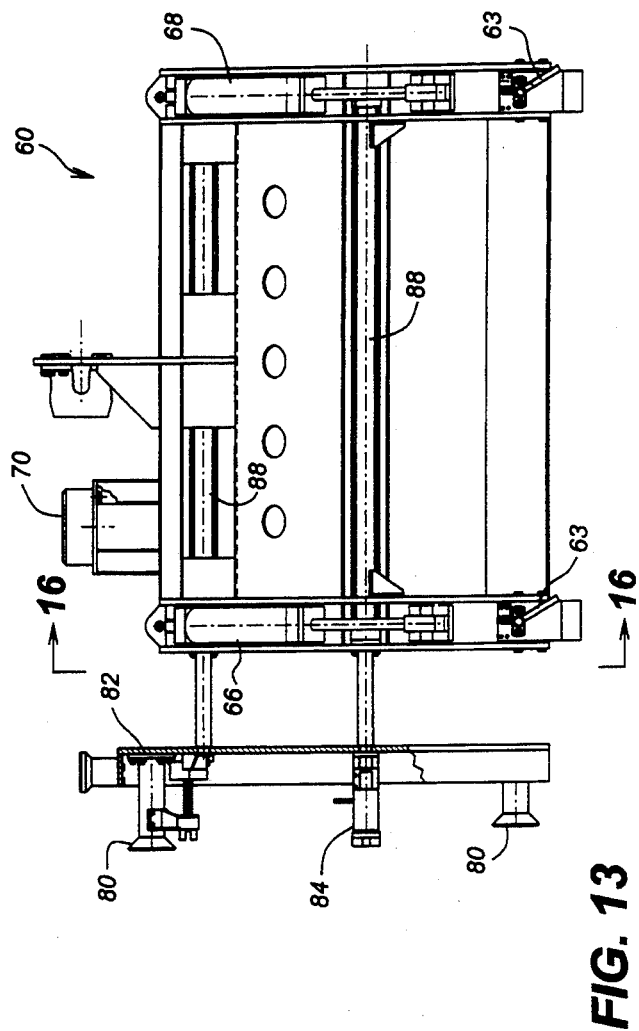
FIG. 13 is a side elevational view of a pipe attachment and receiving assembly.

Referring to FIG. 13, a pipe attachment and receiving (PAR) assembly, designated generally as 60, is deployed attached to a garage 64 (FIG. 14) to the work site using the normal procedure previously described. The PAR assembly 60 is described in detail in copending application entitled "PIPE ATTACHMENT AND RECEIVING ASSEMBLY" filed concurrently herewith. Applicants hereby incorporate by reference copending application entitled "PIPE ATTACHMENT AND RECEIVING ASSEMBLY" filed concurrently herewith. With the assistance of the ROV, the PAR assembly 60 is lowered to the seabed. The ROV releases the davit wire from the PAR assembly 60. The davit wire is returned to the surface and a second PAR assembly 60 is deployed in the same manner.

Figure 14:
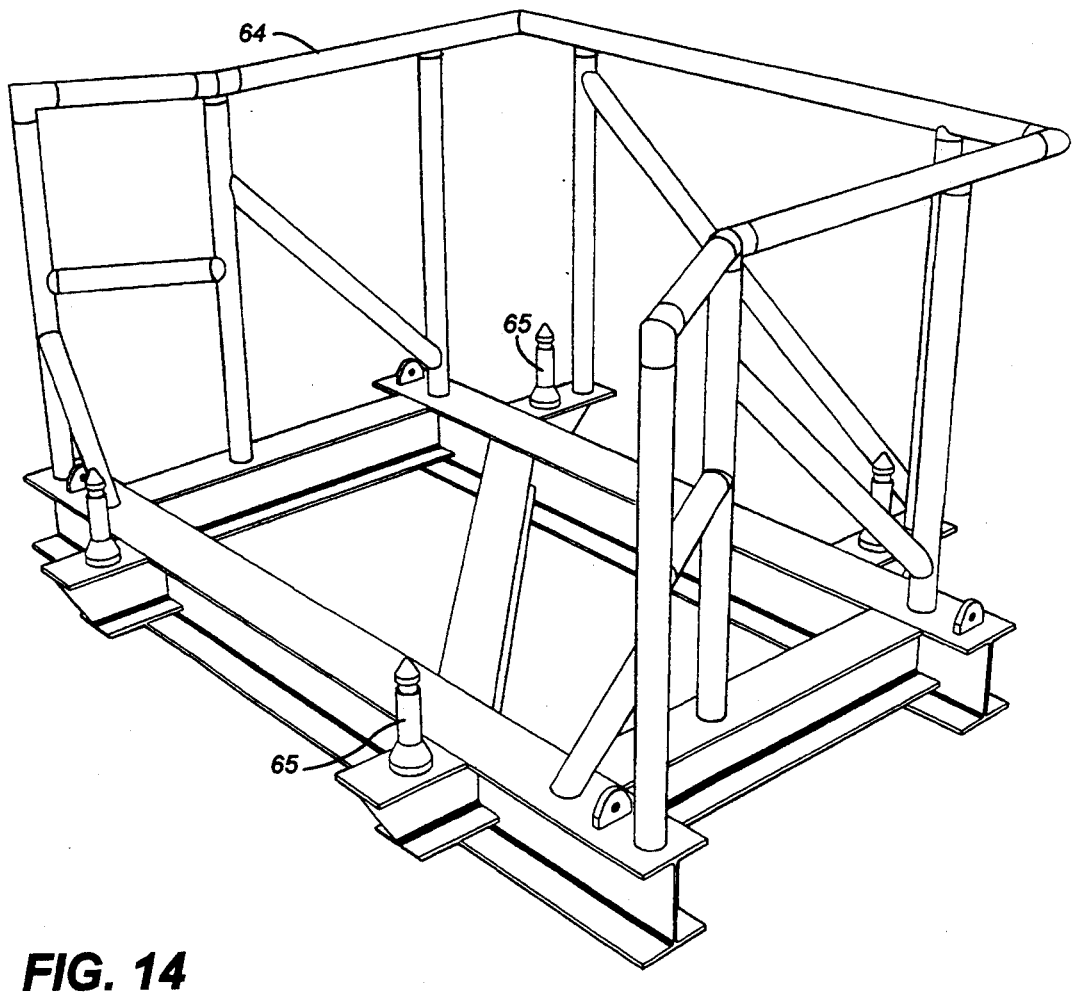
FIG. 14 is a perspective view of a garage to house the pipe attachment and receiving assembly.
Figure 15:
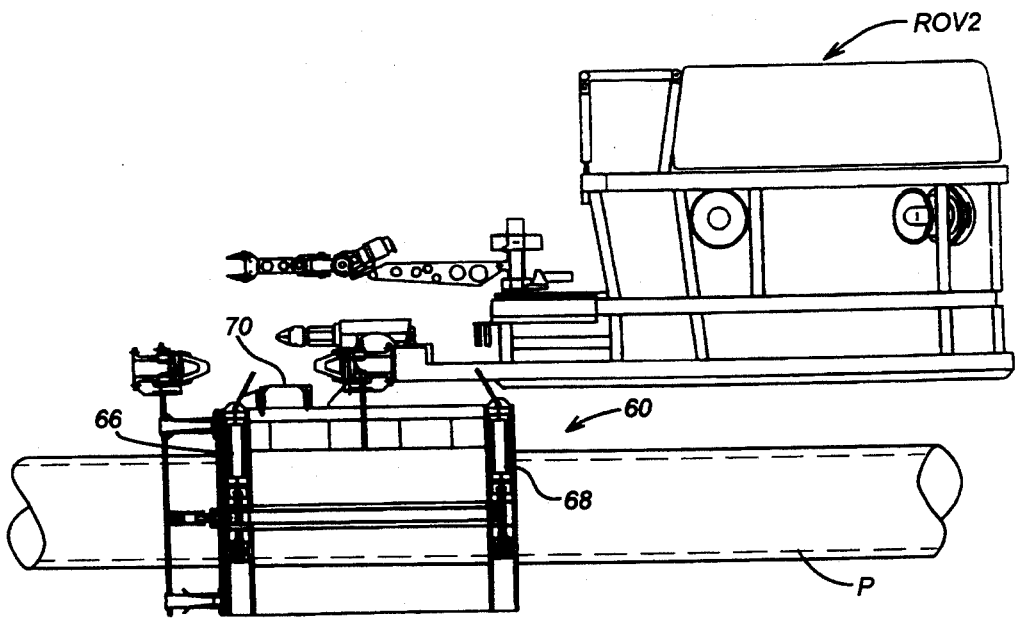
FIG. 15 is a side elevational view of the ROV engaging the pipe attachment and receiving assembly with the pipeline.
Figure 16:
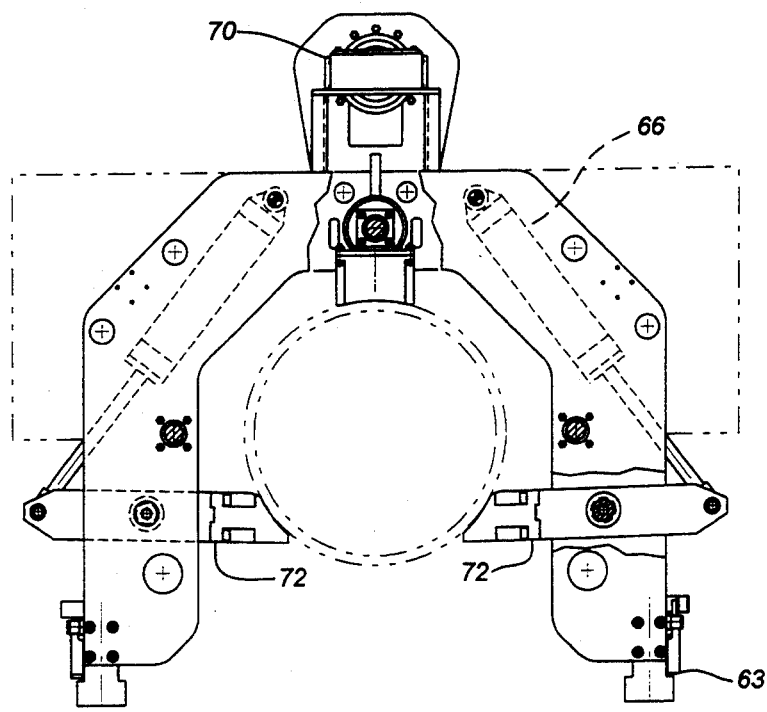
FIG. 16 is a view taken along line 16—16 of FIG. 13.

Referring to FIG. 15, ROV2 moves to the first PAR assembly 60 and engages it. ROV1 releases the latches 63 (FIG. 13) on the PAR assembly 60 from the docking posts 65 on the garage 64 (FIG. 14). ROV2 thrusts upwards and disengages the PAR assembly 60 from the garage 64. Referring to FIGS. 15 and 16, ROV2 swims to the pipeline P and positions the PAR assembly 60 astride the pipeline P. After the location of the PAR assembly 60 has been confirmed, ROV2 places its hot stab in a female receiver 70 on the PAR assembly 60. Hydraulic power from ROV2 operates the forward gripping cylinders 66 on the PAR assembly 60 to firmly grip the pipeline P. The same procedure is used for the rear gripping cylinders 68. A visual check is performed using ROV1 to ensure that the clamp arms 72 (FIG. 16) have closed and that the PAR assembly 60 is still aligned to the pipeline P. ROV2 is then disengaged from the PAR assembly 60. The steps are repeated for installing the second PAR assembly 60.

Figure 17:
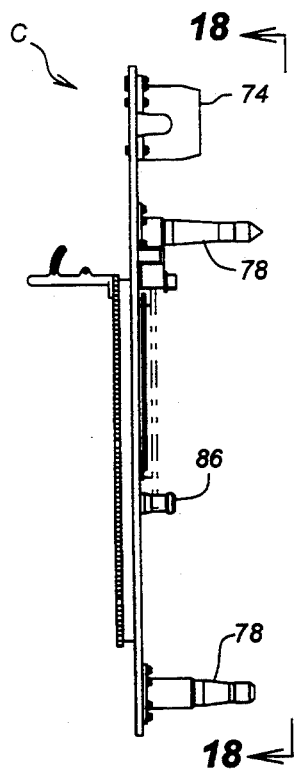
FIG. 17 is a side elevational view of a cutting module.

ROV1 swims to the module stowage rack R (FIG. 7) and engages its male docking probe in a female docking cone (not shown) of a cutting module C (FIG. 17). The cutting module C is described in detail in copending application entitled "PAR ASSEMBLY" previously incorporated by reference herein. A dual hot stab (not shown) from the module stowage rack R is engaged in a female receiver 74 on the cutting module C by ROV1. A plurality of collet connectors 76 (FIG. 7) on the module stowage rack R are disengaged while exerting a small forward thrust. The dual hot stab is removed from the female receiver 74 and returned to a receptacle on the module stowage rack R. ROV1 thrusts rearwards to detach the cutting module C from the module stowage rack R. After ROV1 swims to the PAR assembly 60, ROV2 moves into position to provide visual observation of the alignment.

Figure 18:
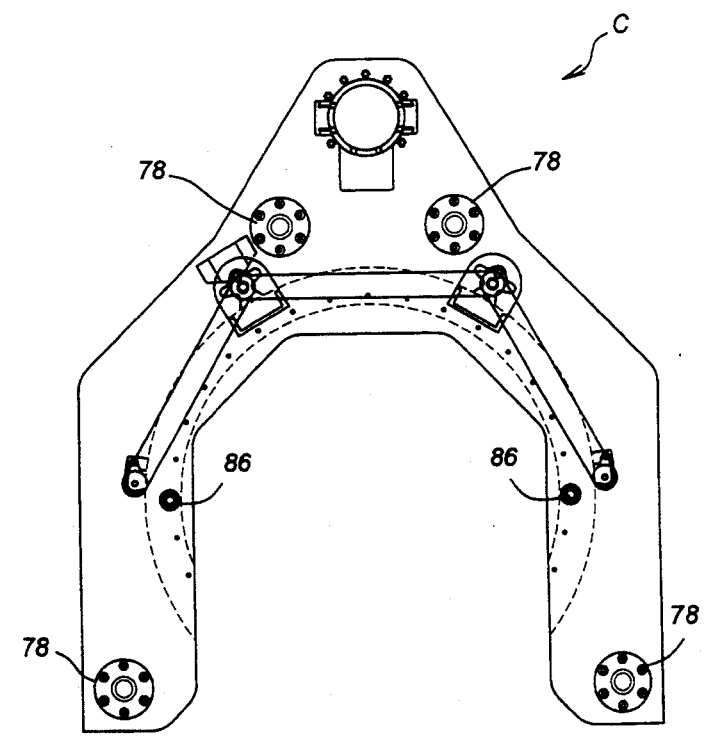
FIG. 18 is a view taken along line 18—18 of FIG. 17.

Referring to FIGS. 17 and 18, the cutting module C includes a plurality of guide probes 78. The guide probes 78 on the cutting module C are aligned with funnels 80 on an interface plate 82 of the PAR assembly 60. ROV1 swims forward and engages the guide probes 78 in the funnels 80. The collet pins 86 (FIG. 17) are locked to the collet connectors 84 (FIG. 13) while asserting a small forward pressure. A small amount of back thrust is applied by ROV1 to confirm that the collet connectors 84 are locked. The hot stab is disengaged and stowed. ROV2 swims back to the module stowage rack R for the next cutting module C and dock on. ROV1 undocks from the cutting module C and then swims to the module stowage rack R for observation. The same steps are repeated by installing the second cutting module C on the second PAR assembly 60 with ROV1 and ROV2 exchanging roles.

The rigging (not shown) for the recovery of the damaged section of pipeline P is lowered using the normal procedure. The recovery rigging includes a pair of slings with snap hooks attached to the end of a davit wire. The recovery rigging is lowered to the seabed and the davit wire is slackened. ROV1 retrieves one end of one sling and passes it under the pipeline P and then releases it. ROV1 swims to the other side of the pipeline P and retrieves the sling and swims away from the pipeline P a short distance before swimming back to and over the pipeline P until the sling is taut. The end of the sling is again passed under the pipeline P and released from the ROV manipulator. ROV1 picks up the sling on the other side of the pipeline P and clips the snap hook onto the main body of the sling. ROV1 releases the sling and swims to the next section of rigging and repeats the steps. The davit wire is disengaged from the recovery rigging and then recovered to the surface.

A hose basket (not shown) is lowered overboard to the seabed. A hose is lashed to the davit wire with polypropylene rope every twenty meters. ROV1 swims to the hose basket and recovers the slurry cutting hose whip. ROV1 swims to the PAR assembly 60 and stabs the slurry hose into the cutting module C and locks it in place. ROV1 moves to the docking cone and docks and stabs the multi-function hot stab. ROV2 moves to the PAR assembly 60 and gets in position to observe the cut of the pipeline P. The PAR stroking cylinders 88 (FIG. 13) are extended by ROV1 until the cutting module C is at the correct location. The cutting is then performed on the pipeline P with the cutting module C. ROV2 visually confirms that the pipe is cut. The PAR stroking cylinders 88 are then retracted approximately 100 millimeters and the pipeline P is cut a second time. The PAR stroking cylinders 88 are then retracted until they are in the fully closed position. ROV1 disengages from the multi-function hot stab of the cutting module C.

The same steps are followed at the other PAR assembly 60 for making the third cut of the pipeline P. Once the third cut of the pipeline P is made, the damaged section of the pipeline P will remain supported by the jacking bag assemblies J at locations J-1 and J+1. ROV2 retracts the cutting module C and disengages the multi-function hot stab from the PAR assembly 60. ROV2 then undocks from the cutting module C. The hose basket is recovered to the surface.

The davit wire is lowered to the seabed. ROV1 picks up the davit wire and pulls it towards the pipe recovery rigging. ROV1 attaches the davit wire to the rigging. The damages section of the pipeline P is then recovered to the surface. The manifold valving of the center jacking bag assemblies at locations J-1 and J+1 are opened which allows the jacking bags j to collapse under self weight. These center jacking bag assemblies J are then removed to a deposit area.

Figure 19:
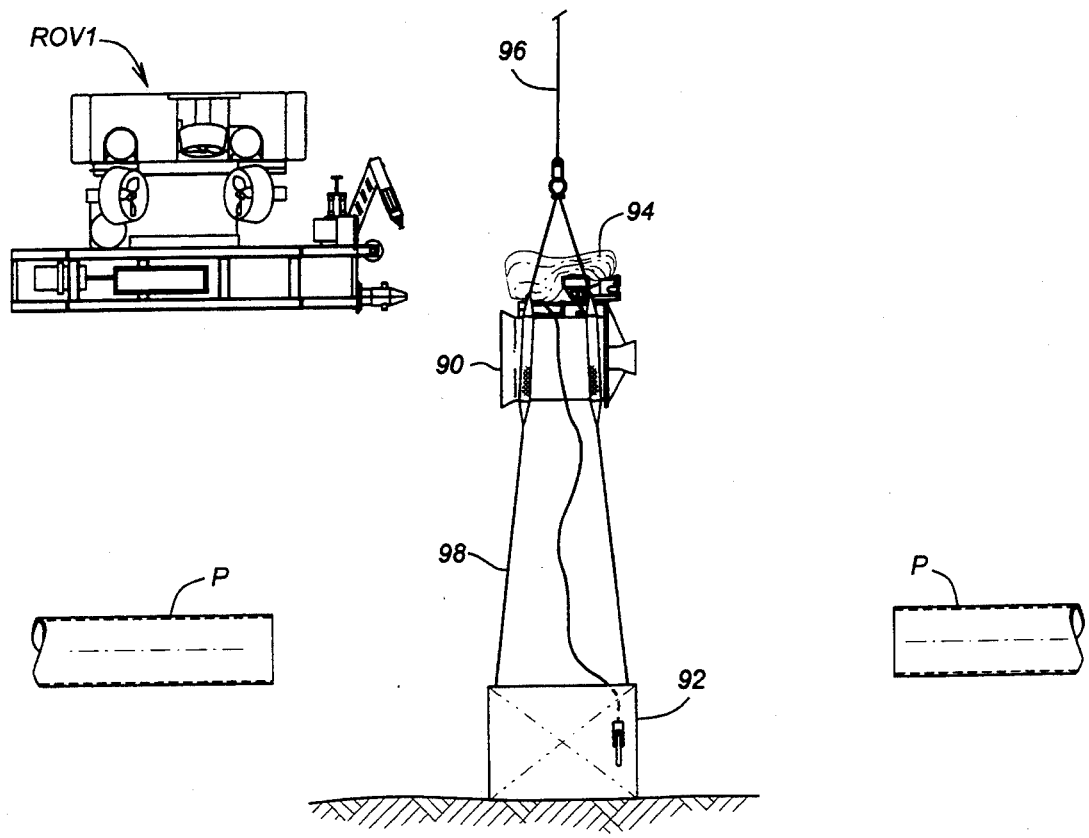
FIG. 19 is a side elevational view of a pipe end preparation tool and a depressor weight being lowered to the seabed.

Referring to FIG. 19, a pipe end preparation tool 90 and a depressor weight 92 are lowered to the seabed. ROV1 monitors their placement on the seabed. As shown in FIG. 19, the pipe end preparation tool 90 is maintained above the seabed. ROV1 releases the tiedowns for an airbag 94 which is attached to the end preparation tool 90. The airbag 94 is inflated by ROV1 until the buoyancy of the airbag 94 supports the submerged weight of the pipe end preparation tool 90. The air valve to the airbag 94 is closed when the depressor weight slings 98 become taut. The davit wire 96 is disconnected and recovered to the surface.

Figure 20:
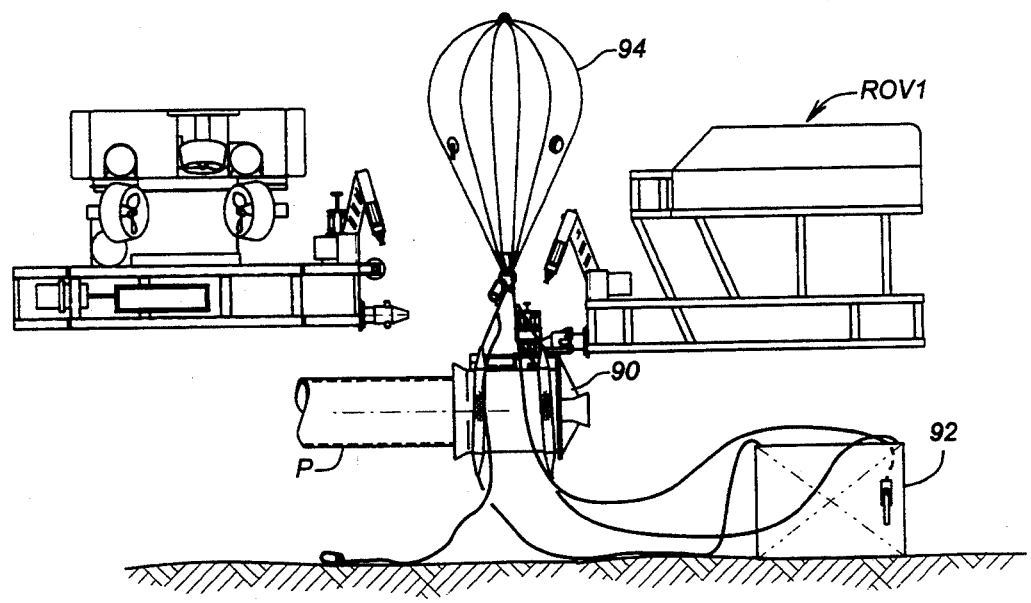
FIG. 20 is a side elevational view of the pipe end preparation tool with inflated airbag being inserted on the cut end of the pipeline.

Referring to FIG. 20, the male docking probe of ROV1 is engaged in the female docking cone on the pipe end preparation tool 90. ROV1 and the end preparation tool 90 fly to the open end of the pipeline P. ROV1 maneuvers the end preparation tool 90 until it is fully inserted on the pipe end. The hot stab of ROV1 is placed in the female receiver on the pipe end preparation tool 90. ROV2 visually confirms the operations. Using hydraulic power from ROV1, the pipe end preparation tool 90 is locked into place and then operated such that tooling has rotated at least 360°. In the preferred embodiment of the invention, the pipe end preparation tool 90 mills grooves into the outer surface of the pipe to provide a sealing surface for the spool section to be described below. The hot stab is disengaged and ROV1 moves rearwards, disengaging the end preparation tool 90 from the pipeline P. ROV1 swims to the pick up point for the pipe end preparation tool 90 and releases the docking probe pin to disengage it from the end preparation tool 90. The davit wire is lowered to the seabed where ROV2 snaps it onto the lifting point of the end preparation tool 93. ROV2 then deflates the airbag 94 to transfer the weight to the davit wire 96. The pipe end preparation tool 90 and the depressor weight 92 are recovered to the surface.

ROV1 swims to the cutting module C on the PAR assembly 60 and engages the male docking probe in the female docking cone. The collet connectors 84 are disengaged and ROV1 thrusts rearwards to detach the cutting module C from the PAR assembly 60. ROV1 docks the cutting module C onto the stowage rack R while ROV2 observes the collet lock. The same steps are repeated to remove the second cutting module C from the second PAR assembly 60. The module stowage rack R is then recovered to the surface.

Once the module stowage rack R is on deck, the cutting modules C are removed and replaced with docking modules D. The docking modules D are described in detail in copending application entitled "PAR ASSEMBLY" previously incorporated by reference herein. The stowage rack R with the docking modules D is then lowered to the seabed. ROV1 swims to the docking module D and engages its male docking probe in the female docking cone. The docking module D is disengaged from the module stowage rack and ROV1 thrusts rearwards to detach the docking module D from the stowage module R. ROV1 swims to the PAR assembly 60 and thrusts forward when the guide probes (not shown) on the docking module and the funnels 80 on the PAR interface plate 82 (FIG. 13) are aligned. ROV1 thrusts forward until the collet connectors 84 are fully entered. Visual confirmation is accomplished with ROV2. The same steps are then followed for installing the second docking module D onto the second PAR assembly 60.

The vertical and horizontal angles of the pipeline ends are visually measured with protractors (not shown) and recorded employing a taut wire (not shown) attached to the two docking modules D. If the pipe ends need realignment, the ROV can engage a torque tool (not shown) in a drive screw cone 100 (FIG. 12) of the pipe support frames F, thus driving the saddle pipe stops 50 and 50' of the trolley 48 in a lateral direction. The torque tool can be operated clockwise or counterclockwise using hydraulic power from ROV1 until it is confirmed visually by ROV2 that the required lateral movement has been achieved. Vertical adjustment can be made by inflating or deflating the water bags 52 in the pipe support frame F until it is confirmed that the required height change has been achieved. The same procedures can be followed for adjusting the second pipeline end. The taut wire is detached from the docking modules D after the realignment steps have been completed.

Figure 21:
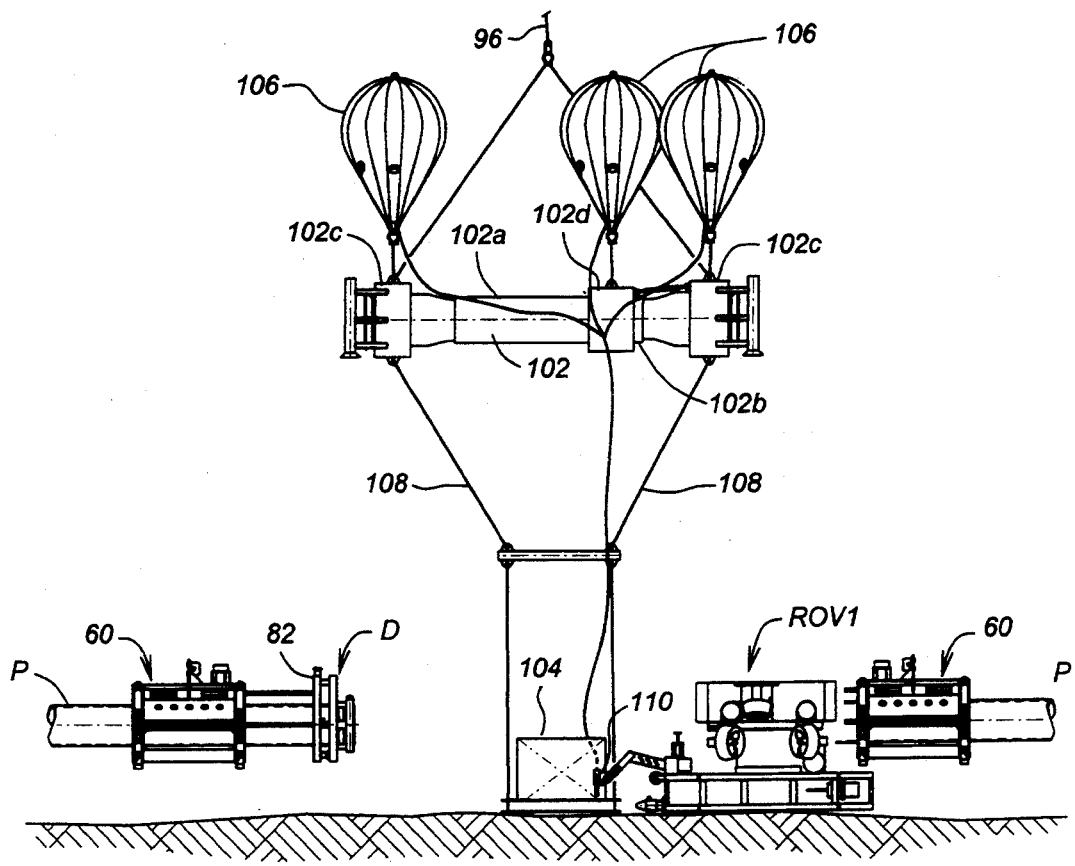
FIG. 21 is a side elevational view of a spool with attached airbags being inflated.

Referring to FIG. 21, a spool 102 and a depressor weight 104 are lowered to the seabed. In the preferred embodiment of the present invention, the spool 102 has telescoping components 102a and 102b. Each telescoping component 102a, 102b, includes an end clamping and sealing assembly 102c which clamps and seals to the end of the pipeline P. The spool 102 also includes a central slip joint 102d having one end connected to the telescoping component 102a. A spool assembly 102 and end clamping and sealing assemblies 102c are described in detail in U.S. Pat. Nos. 4,371,198, 4,195,865, and 4,676,531 to Martin. Applicants hereby incorporate by reference U.S. Pat. Nos. 4,371,198, 4,195,865, and 4,676,531 to Martin.

ROV1 monitors the placement of the depressor weight on the seabed. ROV1 then releases the airbag tie downs which are mounted to the spool 102. The airbags 106 are inflated by ROV1 opening a valve 110 on the depressor weight 104. The valve 110 is closed when the spool 102 begins to rise and the load is transferred from the davit wire 96 to the depressor weight slings 108. The davit wire 96 is released and returned to the surface.

Figure 22:
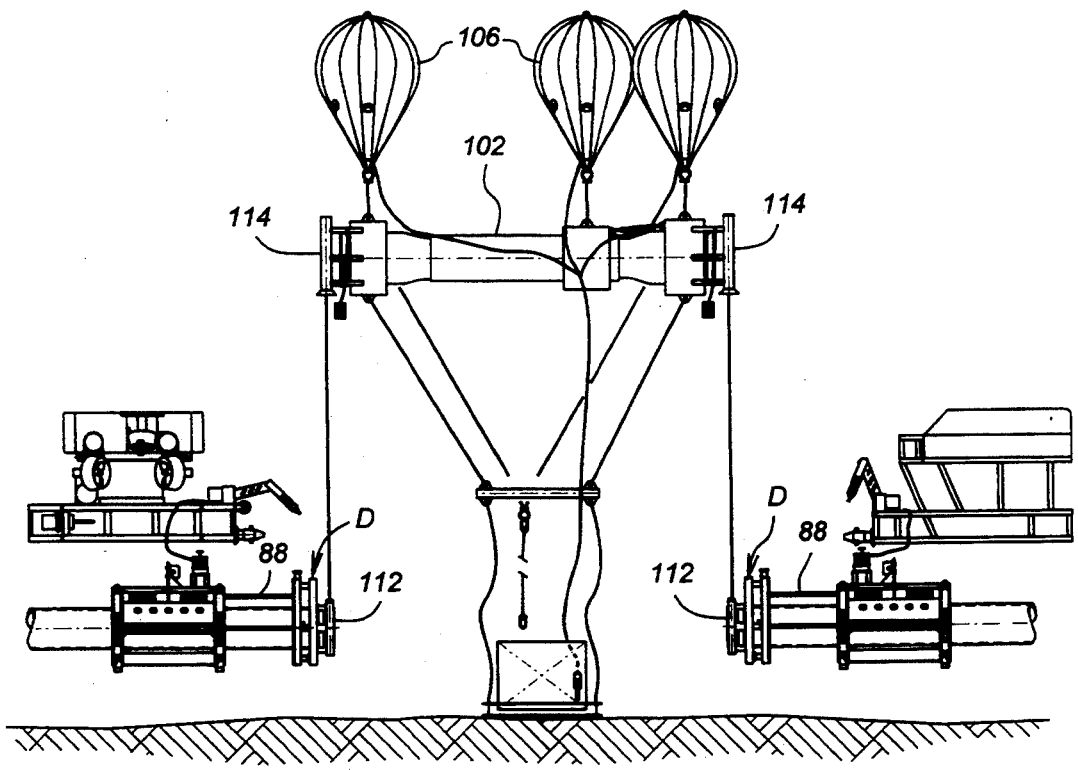
FIG. 22 is a side elevational view of the rigging for hauling the spool on the docking modules.

ROV2 moves to the first PAR assembly 60 and engages the male docking probe in the female docking cone. The multi-way hot stab of ROV2 is placed in the female receiver on the PAR assembly 60. ROV1 moves to the docking module D on the first PAR assembly 60. ROV1 retrieves a docking collet (not shown) from the docking post 112. ROV1 swims to the corresponding guide funnel 114 of the spool 102 while ROV2 simultaneously operates the appropriate winch (not shown) to pay out on the docking module D using hydraulic power from ROV2. The docking collet is inserted into the guide funnel 114 and pushed fully home. ROV1 releases a handle of the docking collet and pulls the cord to withdraw the pin from the handle of the lower docking collet. This allows the handle to fall, but continue to hang from the cord. The handle is removed from the cord. ROV1 moves to the lower portion of the guide funnel and releases the holding pin for the upper docking collet. ROV1 moves to the upper portion of the funnel and retrieves the pulling rope for the upper docking collet. ROV1 thrusts upwards, simultaneously operating the appropriate winch on the docking module to pay out using hydraulic power from ROV2. ROV1 continues thrusting until the upper docking collet pulls out from the guide funnel and engages the lower docking collet on the funnel upper lip. ROV1 moves back to the docking module D on the PAR assembly 60. ROV1 retrieves the next docking collet from the docking post using the handle. The same steps are repeated for this collet. These same steps are followed at the second PAR assembly 60. ROV2 moves to the PAR assembly 60 and engages the male docking probe in the female docking cone. As shown in FIG. 22, the stroking cylinders 88 are fully extended on the PAR assembly 60 using hydraulic power from ROV2. Similarly, the stroking cylinders 88 of the second PAR assembly 60 are fully extended by ROV1. ROV1 and ROV2 are disengaged from the PAR assemblies 60. ROV1 and ROV2 are moved to a suitable position for observation of the docking of the spool 102 onto the docking module D. Four winches are operated simultaneously to haul in the spool 102. The four winches are powered by hydraulic power from ROV1 and ROV2. The spool 102 is hauled in until the spool guide funnels 114 are approximately 500 millimeters above the docking posts 112. ROV1 and ROV2 visually confirm the horizontal separation between the guide funnels 114 and the docking posts 112. If required, the stroking cylinders 88 of the PAR assemblies 60 may be retracted until visual confirmation is obtained that the docking module D has moved the required amount. The winches are activated to haul in the guide funnels 114 onto the docking posts 112. Once the docking posts 112 are engaged in the guide funnels 114, the rigging is released.

Figure 23:
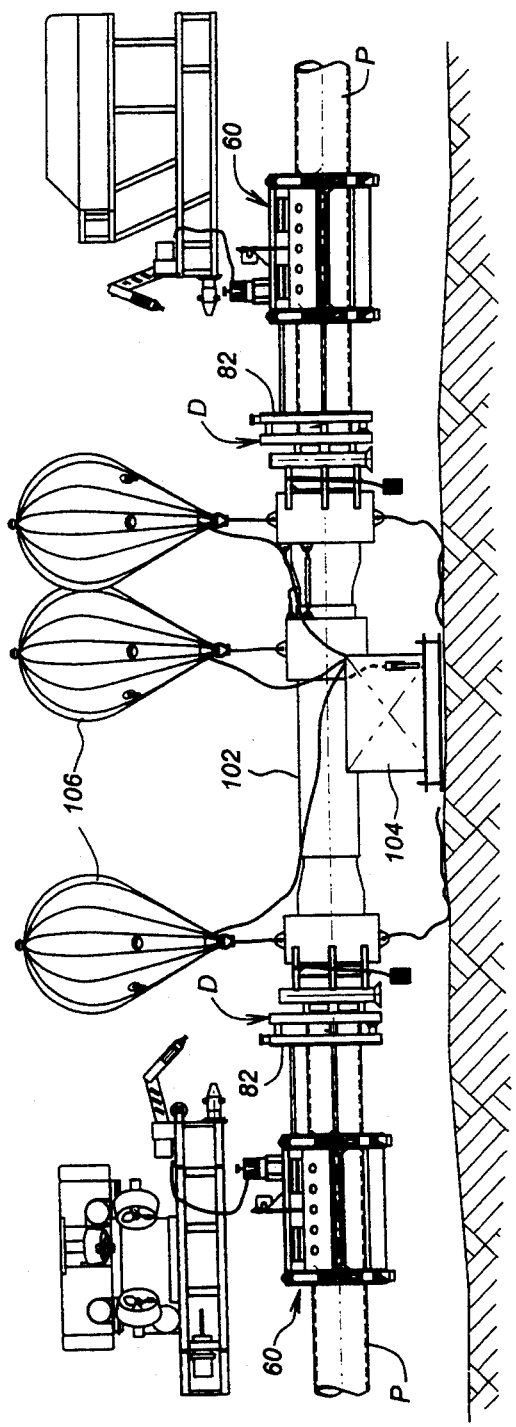
FIG. 23 is a side elevational view of the spool on the docking module.
Figure 24:
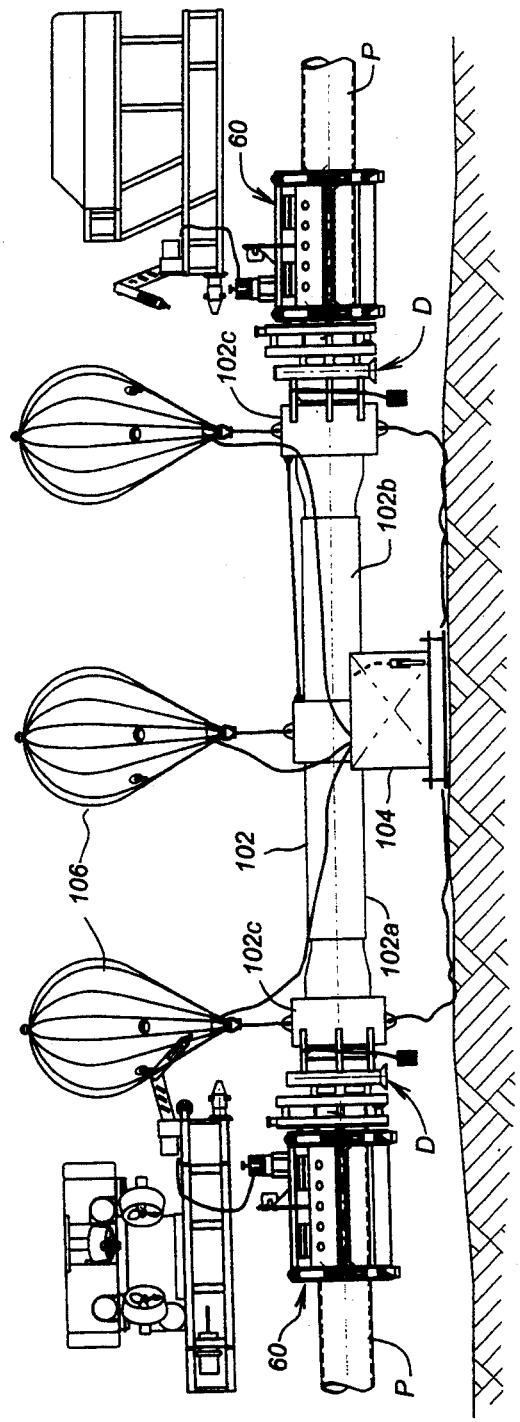
FIG. 24 is a side elevational view of the spool pulled onto the pipe ends.

Referring to FIG. 23, the spool 102 is hauled all the way on the docking modules D. As shown in FIG. 24, the stroking cylinders 88 are retracted on the PAR assemblies 60 until the spool 102 and the pipe end are fully engaged. ROV1 attaches to the spool telescoping component 102a and hydraulically engages the end clamping and sealing assembly 102c to the pipe end. ROV1 then moves to the other spool telescoping component 102b and attaches thereto. ROV1 hydraulically engages the second end clamping and sealing assembly 102c to the pipe end.

The pipeline P is now repaired and testing is done on the sealing of the spool connection to the pipeline P. Once the testing is completed, the equipment is returned to the surface in generally reverse order. The lifting bags 52 of the pipe support frame F are deflated and the pipe support frames F are pulled from beneath the pipeline P. The pipeline P then rests on the jacking bags assemblies J. The jacking bags j are deflated permitting the pipeline P to rest on the seabed. The jacking bag assemblies J are then pulled from the pockets 38 beneath the pipeline P and retrieved to the surface.

It should be understood that the invention consists of a method for repairing a submerged pipeline and the invention should not be unduly limited to the foregoing set forth for illustrative purposes. Various modifications and alterations of the invention will be apparent to those skilled in the art without departing from the true scope of the invention.

What is claimed is:

1. A method for cutting a damaged subsea pipeline setting on the seabed, the method comprising the steps of:
   lowering a plurality of pipe support frames to the seabed;
   positioning the pipe support frames beneath the subsea pipeline beyond each end of the damaged section of the pipeline;
   expanding the pipe support frames to elevate the damaged section of the pipeline;
   lowering a pair of pipe attachment and receiving assemblies to the seabed;
   positioning the pipe attachment and receiving assemblies astride the pipeline such that one pipe attachment and receiving assembly is positioned beyond each end of the damaged section of the pipeline;
   gripping the pipeline with the pipe attachment and receiving assemblies;
   lowering a pair of cutting modules to the seabed;
   attaching one cutting module to each of the pipe attachment and receiving assemblies;
   cutting the pipeline at a first location with one cutting module to form a first pipeline end;
   cutting the pipeline at a second location with the second cutting module to form a second pipeline end; and
   detaching the cutting modules from the pipe attachment and receiving assemblies.

2. The method for cutting a damaged subsea pipeline of claim 1, further comprising the step of excavating a pipe support frame pocket in the seabed beneath the pipeline prior to positioning each of the pipe support frames beneath the subsea pipeline.

3. The method for cutting a damaged subsea pipeline of claim 2, further comprising the steps of:
   lowering a plurality of jacking bag assemblies to the seabed;
   placing the jacking bag assemblies in the pockets excavated beneath the pipeline; and
   inflating the jacking bag assemblies to initially elevate a section of the pipeline from the seabed to provide clearance to position the pipe support frames beneath the subsea pipeline.

4. The method for cutting a damaged subsea pipeline of claim 1, wherein said step of expanding the pipe support frames to elevate the damaged section of the pipeline is accomplished by inflating a plurality of lifting bags in the pipe support frames.

5. A method for repairing a damaged subsea pipeline setting on the seabed, the method comprising the steps of:
   lowering a plurality of pipe support frames to the seabed;
   positioning the pipe support frames beneath the subsea pipeline beyond each end of the damaged section of the pipeline;
   expanding the pipe support frames to elevate the damaged section of the pipeline;
   lowering a pair of pipe attachment and receiving assemblies to the seabed;
   positioning the pipe attachment and receiving assemblies astride the pipeline such that one pipe attachment and receiving assembly is positioned beyond each end of the damaged section of the pipeline;
   gripping the pipeline with the pipe attachment and receiving assemblies;
   lowering a pair of cutting modules to the seabed;
   attaching one cutting module to each of the pipe attachment and receiving assemblies;
   cutting the pipeline at a first location with one cutting module to form a first pipeline end;
   cutting the pipeline at a second location with the second cutting module to form a second pipeline end; and
   detaching the cutting modules from the pipe attachment and receiving assemblies;
   lowering a pair of docking modules to the seabed;
   attaching one docking module to each of the pipe attachment and receiving assemblies;
   lowering a telescoping spool section to the seabed;
   docking the telescoping spool section onto the docking modules;
   expanding the telescoping spool section until the spool section engages the first and second pipeline ends; and
   connecting the spool section to the first and second pipeline ends.

6. The method for repairing a damaged subsea pipeline of claim 5, further comprising the step of aligning the ends of the pipeline with each other by adjusting the pipe support frames.

7. The method for repairing a damaged subsea pipeline of claim 5, wherein said step of expanding the telescoping spool section until the spool section engages the pipeline ends is accomplished by retracting the docking modules towards the pipe attachment and receiving assemblies.

8. The method for repairing a damaged subsea pipeline of claim 7, wherein said step of retracting the docking modules is accomplished with hydraulic power operated at the seabed.

9. A method for cutting a damaged subsea pipeline setting on the seabed, the method comprising the steps of:
   excavating a plurality of pockets in the seabed beneath the pipeline;
   lowering a plurality of jacking bag assemblies to the seabed;
   placing the jacking bag assemblies in the pockets excavated beneath the pipeline;
   inflating the jacking bag assemblies to initially elevate a section of the pipeline from the seabed;
   lowering a plurality of pipe support frames to the seabed;
   positioning the pipe support frames beneath the subsea pipeline beyond each end of the damaged section of the pipeline;
   expanding the pipe support frames to further elevate the damaged section of the pipeline;
   lowering a pair of pipe attachment and receiving assemblies to the seabed;

positioning the pipe attachment and receiving assemblies astride the pipeline such that one pipe attachment and receiving assembly is positioned beyond each end of the damaged section of the pipeline;

gripping the pipeline with the pipe attachment and receiving assemblies;

lowering a pair of cutting modules to the seabed;

attaching one cutting module to each of the pipe attachment and receiving assemblies;

cutting the pipeline at a first location with one cutting module to form a first pipeline end;

cutting the pipeline at a second location with the second cutting module to form a second pipeline end; and detaching the cutting modules from the pipe attachment and receiving assemblies.

10. The method for cutting a damaged subsea pipeline of claim 9, wherein said step of expanding the pipe support frames to further elevate the damaged section of the pipeline is accomplished by inflating a plurality of lifting bags in the pipe support frames.

11. A method for repairing a damaged subsea pipeline setting on the seabed, the method comprising the steps of:

excavating a plurality of pockets in the seabed beneath the pipeline;

lowering a plurality of lacking bag assemblies to the seabed;

placing the jacking bag assemblies in the pockets excavated beneath the pipeline;

inflating the lacking bag assemblies to initially elevate a section of the pipeline from the seabed;

lowering a plurality of pipe support frames to the seabed;

positioning the pipe support frames beneath the subsea pipeline beyond each end of the damaged section of the pipeline;

expanding the pipe support frames to further elevate the damaged section of the pipeline;

lowering a pair of pipe attachment and receiving assemblies to the seabed;

positioning the pipe attachment and receiving assemblies astride the pipeline such that one pipe attachment and receiving assembly is positioned beyond each end of the damaged section of the pipeline;

gripping the pipeline with the pipe attachment and receiving assemblies;

lowering a pair of cutting modules to the seabed;

attaching one cutting module to each of the pipe attachment and receiving assemblies;

cutting the pipeline at a first location with one cutting module to form a first pipeline end;

cutting the pipeline at a second location with the second cutting module to form a second pipeline end; and detaching the cutting modules from the pipe attachment and receiving assemblies;

lowering a pair of docking modules to the seabed;

attaching one docking module to each of the pipe attachment and receiving assemblies;

lowering a telescoping spool section to the seabed;

docking the telescoping spool section onto the docking modules;

expanding the telescoping spool section until the spool section engages the first and second pipeline ends; and connecting the spool section to the first and second pipeline ends.

12. The method for repairing a damaged subsea pipeline of claim 11, further comprising the step of aligning the ends of the pipeline with each other by adjusting the pipe support frames.

13. A method for installing a telescoping spool section between a pair of opposing open ends of a severed subsea pipeline setting on the seabed, the method comprising the steps of:

lowering a plurality of pipe support frames to the seabed;

positioning the pipe support frames beneath the subsea pipeline;

expanding the pipe support frames to elevate the end portions of the pipeline;

lowering a pair of pipe attachment and receiving assemblies to the seabed;

positioning the pipe attachment and receiving assemblies astride the pipeline such that one pipe attachment and receiving assembly is positioned at each end of the pipeline;

gripping the pipeline with the pipe attachment and receiving assemblies;

lowering a pair of docking modules to the seabed;

attaching one docking module to each of the pipe attachment and receiving assemblies;

lowering a telescoping spool section to the seabed;

docking the telescoping spool section onto the docking modules;

expanding the telescoping spool section until the spool section engages the pipeline ends; and connecting the spool section to the pipeline ends.

14. The method for installing a telescoping spool section of claim 13, further comprising the step of aligning the ends of the pipeline with each other by adjusting the pipe support frames.

15. The method for installing a telescoping spool section of claim 13, further comprising the step of excavating a pipe support frame pocket in the seabed beneath the pipeline prior to positioning each of the pipe support frames beneath the subsea pipeline.

16. The method for installing a telescoping spool section of claim 15, further comprising the steps of:

lowering a plurality of jacking bag assemblies to the seabed;

placing the jacking bag assemblies in the pockets excavated beneath the pipeline; and inflating the jacking bag assemblies to initially elevate a section of the pipeline from the seabed to provide clearance to position the pipe support frames beneath the subsea pipeline.

17. The method for installing a telescoping spool section of claim 13, wherein said step of expanding the pipe support frames to elevate the damaged section of the pipeline is accomplished by inflating a plurality of lifting bags in the pipe support frames.

18. The method for installing a telescoping spool section of claim 13, wherein said step of expanding the telescoping spool section until the spool section engages the pipeline ends is accomplished by retracting the docking modules towards the pipe attachment and receiving assemblies.

19. The method for installing a telescoping spool section of claim 18, wherein said step of retracting the docking modules is accomplished with hydraulic power operated at the seabed.

* * * * *

UNITED STATES PATENT AND TRADEMARK OFFICE
CERTIFICATE OF CORRECTION

PATENT NO.  : 5,425,599

DATED       : June 20, 1995

INVENTOR(S) : N. VICTOR HALL AND PETER RASH

It is certified that error appears in the above-identified patent and that said Letters Patent is hereby corrected as shown below:

COLUMN 2, LINE 44, PLEASE DELETE "WEIGHTED" AND INSERT THEREFOR --WEIGHTS--

COLUMN 13, LINE 28, PLEASE DELETE "LACKING" AND INSERT THEREFOR --JACKING--

COLUMN 13, LINE 32, PLEASE DELETE "LACKING" AND INSERT THEREFOR --JACKING--

Signed and Sealed this

Twenty-sixth Day of September, 1995

Attest:

BRUCE LEHMAN

*Attesting Officer*     *Commissioner of Patents and Trademarks*